Patented Sept. 30, 1930

1,776,885

UNITED STATES PATENT OFFICE

HAROLD C. CHEETHAM, OF EAST ORANGE, NEW JERSEY, ASSIGNOR TO BAKELITE CORPORATION, A CORPORATION OF DELAWARE

PROCESS OF MAKING IMPREGNATED SHEETS

No Drawing.   Application filed November 16, 1926.   Serial No. 148,774.

Fibrous sheets impregnated with a reactive resin of the phenol-aldehyde type, such as are employed in the manufacture of laminated products, have heretofore been prepared either by coating or impregnating a preformed sheet of paper or cloth with an alcoholic or other solution of the reactive resin and driving off the volatile solvent; or by beating together the fiber and the reactive resin, or ingredients capable of forming a reactive resin, in presence of water, laying the mixture into a sheet as in the usual practice of paper manufacture, and drying the sheet while adopting precautions to retain the resin in its reactive and plastic state.

In the first of these processes relatively expensive solvents such as alcohol are used. In the second process mentioned it is necessary to adjust, maintain and distribute with considerable care the ingredients in the liquid mass, in order to insure a proper plasticity in the reactive resin in the dried sheet. According to the present process these disadvantages of both of the prior processes are avoided.

In this connection it should be explained that the term "reactive resin" is used herein to define those resins, usually and preferably but not necessarily of the phenol-aldehyde type, which in their initial or soluble and fusible state are reactive in the sense that by sufficient application of heat they are converted into a so-called "resinoid" modification, in which they are infusible and insoluble, or incompletely soluble, in the ordinary resin solvents. The transformation from the reactive resin to the final hard resinoid state is gradual and progressive. The resinoid modification may be plasticized by the presence therein of suitable liquid or fusible materials which have the capability of entering into solid solution with the resinoid; and when so plasticized it possesses the capability of welding in the sense that its particles can be made to cohere into a strong and homogeneous aggregate by a sufficient application of heat and pressure.

The present invention avails itself of the welding capability of plasticized resinoids to form a sheet which is directly applicable for the manufacture of laminated products, such for example as panel boards or the like.

According to the invention in its preferred embodiment a reactive resin of the phenol-aldehyde type is plasticized by incorporating therewith a sufficient proportion, say about 5 to 45 percent by weight, of a high boiling organic substance which is not only a solvent for the resin in its reactive condition, but is capable of functioning as a so-called solid solvent for the resinoid:—that is to say is retained by the resinoid and exerts a plasticizing effect thereon. The plasticizing agent should furthermore be a substance which is practically insoluble in water, and which in the resin composition after being combined with the resin has a negligible vapor pressure at the ordinary temperature range. Among such solvents I prefer to use the di-alkyl esters of organic acids, such as the di-ethyl or di-butyl oxalates, tartrates, phthalates, etc.; although such bodies as naphthalene, naphthalene chlorides, non-reactive natural or synthetic resins, and the like are also suitable. The plasticized reactive resin is then heated sufficiently to transform it wholly or largely to the resinoid state, characterized as above explained, by insolubility or incomplete solubility in alcohol, acetone and other resin solvents; and by infusibility in the sense that it cannot be liquified by heat although capable, in its plasticized condition, of being softened by application of moderate temperatures. The plasticized resinoid is then comminuted in any suitable manner, as by wet or dry milling or even if desired by use of the so-called colloid mill. It is then thoroughly beaten in presence of water with the fiber, this operation being preferably carried out in a beating engine or equivalent device, as in the ordinary practice of paper making. The fiber-resinoid mixture is then laid into sheets which are dried on rolls as in standard paper-making practice. For the manufacture of laminated panels or other laminated products the resinoid-impregnated sheets are superposed in any desired number and consolidated in steam-heated presses, the temperature and the application of pressure being controlled and adjusted to effect an effective bonding of the sheets.

The essential distinction between the present process and the prior processes mentioned above, is that in said prior processes the aim was to insure that the resin should exist in the dried sheet in the reactive state; whereas in the present case the reactive resin is largely or entirely converted into a plasticized resinoid before it is incorporated into the sheet. It is of course not essential to the operativeness of the process that this transformation into the resinoid modification should be absolutely complete before the sheet is formed, since any residual reactive resin will be transformed during the final hot-pressing operation: but it is desired that the transformation should be sufficiently advanced to avoid serious loss by leaching of soluble resin-forming components.

A further advantage of the present process lies in the fact that the resinoid is not subject to loss of plasticity by application of moderate heating, nor is it fusible at the drying temperature of the sheets, so that there is not in this process the same necessity for accurate control of the drying conditions as exists when the resin is to be kept in its reactive state until the hot-pressing operation.

The process is applicable, although with less advantage, for use with other reactive resins than those of the phenol-aldehyde type: for example resins of the urea-formaldehyde type, or those of the glycerol-phthalic anhydride type, both of which are reactive in the sense that they lose their initial solubility and fusibility under application of heat, may be employed in an essentially similar manner, and with the same type of plasticizing agents.

I claim:

1. Process of making laminated products comprising commingling a fiber and a plasticized resinoid in presence of water, laying into sheets, drying and superposing the sheets, and consolidating them by a hot-pressing operation.

2. Process of making laminated products comprising heating a reactive resin until it loses its initial fusibility and solubility, commingling the resulting resinoid associated with a plasticizing agent with fiber, laying the mixture into sheets in presence of water, drying and superposing the sheets, and consolidating them by a hot-pressing operation.

3. Process of making impregnated sheets suitable for the manufacture of laminated products, comprising commingling a fiber and a plasticized resinoid composition in presence of water, said plasticized resinoid composition practically insoluble in water, laying the fiber-resinoid mixture into sheets, and drying the same.

4. Process of making impregnated sheets suitable for the manufacture of laminated products, comprising heating a reactive resin associated with a suitable plasticizing agent until it loses its initial fusibility and solubility and becomes practically insoluble in water, commingling the resulting plasticized resinoid composition in comminuted state with fiber in presence of water, laying the fiber-resinoid mixture into sheets, and drying the same.

In testimony whereof, I affix my signature.

HAROLD C. CHEETHAM.